FREQUENCY RESPONSE CONTROL MEANS FOR HIGH-FREQUENCY AMPLIFIERS

Filed Sept. 6, 1950 2 Sheets-Sheet 1

INVENTOR.
OLIVER F. CHENEY
BY
Brown, Denk & Synnestvedt
AGENTS

INVENTOR.
OLIVER F. CHENEY
BY
Brown, Jenk & Synnestvedt
AGENTS

Patented July 21, 1953 2,646,471

UNITED STATES PATENT OFFICE 2,646,471

FREQUENCY RESPONSE CONTROL MEANS FOR HIGH-FREQUENCY AMPLIFIERS

Oliver F. Cheney, Philadelphia, Pa., assignor to Philco Corporation, Philadelphia, Pa., a corporation of Pennsylvania Application September 6, 1950, Serial No. 183,359

3 Claims. (Cl. 179—171)

The invention herein described and claimed relates to high-frequency amplifiers, and particularly to means for modifying the frequency response of a multi-stage stagger-tuned amplifier system in response to variations in signal strength.

The problem to which the present invention is directed is of particular importance in television receivers.

Figure 2:
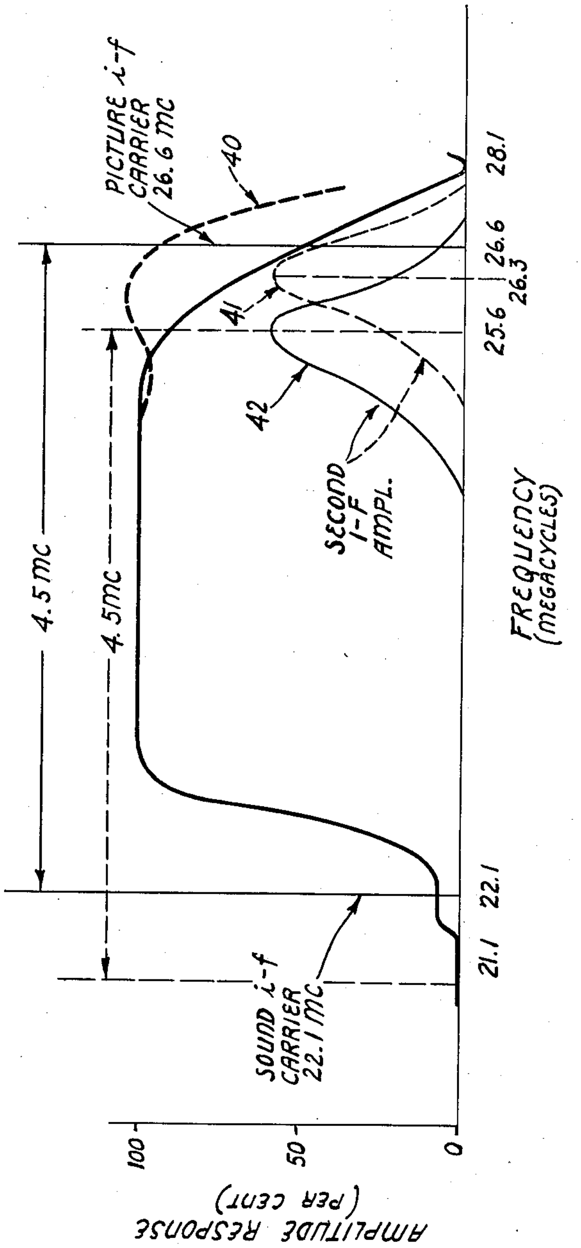

As is shown graphically in Figure 2, to which detailed reference will hereinafter be made, the picture I.-F. carrier, in most television receivers at least, is located at approximately the 50% amplitude-response point at the upper-frequency end of the overall characteristic of the multi-stage stagger-tuned I.-F. amplifier system. The sound I.-F. carrier is located on a relatively level shelf at approximately the 5% amplitude-response point at the lower-frequency end of the curve, as also shown in Figure 2. When such a receiver is operated in an area where the signal strength is weak, the reproduced image may be largely obscured by noise signals, since a substantial portion of the noise signals will be located on the 100% amplitude-response portion of the characteristic. In such case, the main areas of the reproduced image could be strengthened by shifting the picture I.-F. carrier toward a lower frequency, say from 26.6 megacycles to 25.6 megacycles, for to do so would move the carrier up the slope of the characteristic from the 50% to about the 90% or 100% amplitude-response point. This would improve the signal-to-noise ratio with respect to the low-frequency modulation components of the picture signal. However, if the operator does shift the picture I.-F. carrier in the manner suggested, he does so by mistuning the local oscillator and, as a result, both the high-frequency modulation components of the picture signal and the sound signal will be impaired rather than improved. Where the signal is weak, the sacrifice of high definition or fine picture detail for increased strength in the main areas of the picture is advantageous but the sacrifice of all or a substantial amount of the sound output is objectionable. In many prior art television receivers, operated in areas of weak signal, when the operator adjusts his fine-tuning control to strengthen the picture, he loses the sound completely. For, when he shifts the picture I.-F. carrier up the slope to the 90–100% level, he unavoidably moves the sound I.-F. carrier off the shelf and down the slope at the lower-frequency end of the characteristic.

Accordingly, it is a principal object of the present invention to improve the sensitivity of a television receiver by providing means operative automatically on weak signals to improve the signal-to-noise ratio with respect to the low-frequency modulation components of the picture signal without, however, adversely affecting the sound output.

Another object is to provide, in the I.-F. amplifier system of a television receiver whose picture I.-F. carrier frequency is higher than the sound I.-F. carrier frequency, means responsive to variations in applied automatic-gain-control bias for boosting automatically the low-frequency modulation components of the picture signal when the signal strength is weak, without impairing the sound output.

The foregoing objects are achieved, in accordance with the present invention, by providing, in a selected stage of the multi-stage stagger-tuned I.-F. amplifier system, means automatically responsive to variations in applied automatic-gain-control bias to boost the response at the upper-frequency end of the I.-F. amplifier system's characteristic. The proper tuning point for the picture I.-F. carrier remains unchanged in frequency but the amplitude-response at the picture I.-F. carrier frequency varies as a function of the applied automatic-gain-control bias. On very weak signals, the frequency response at the upper-frequency end of the pass band is boosted to the extent required to place the picture I.-F. carrier in the 90–100% amplitude-response region. On signals of intermediate strength, the response at the upper-frequency end is boosted to an intermediate extent. On strong signals, the response is normal, being such that the picture I.-F. carrier is located at about the 50% amplitude-response point on the characteristic. The lower-frequency end of the response characteristic is not appreciably disturbed by the action of the means provided by the present invention and the sound output is not impaired.

The means provided by the present invention comprise a capacitor and cathode load impedance of selected magnitudes connected in that stage of the stagger-tuned I.-F. amplifier system which supports the upper-frequency end of the response curve. The capacitor is connected between the grid and the cathode end of the cathode load impedance. The cathode load impedance is preferably a resistor.

In the absence of the capacitor and cathode load impedance provided by the present invention, when the signal strength becomes weaker, the applied automatic-gain-control bias decreases, the gain and mutual conductance of the particular tube increases, the input capacitance of the tube increases, and the response at the upper-frequency end of the characterisic decreases due to the resultant change in tuning of the input circuit. When, however, the aforesaid capacitor and cathode load impedance are employed, if the signal strength becomes weaker and the applied bias decreases, the gain and mutual conductance of the tube increases as before, but the effective input capacitance of the stage decreases, rather than increases, and the response at the upper-frequency end of the characteristic is boosted, rather than decreased, due to the resultant change in tuning of the input circuit.

Figure 1:
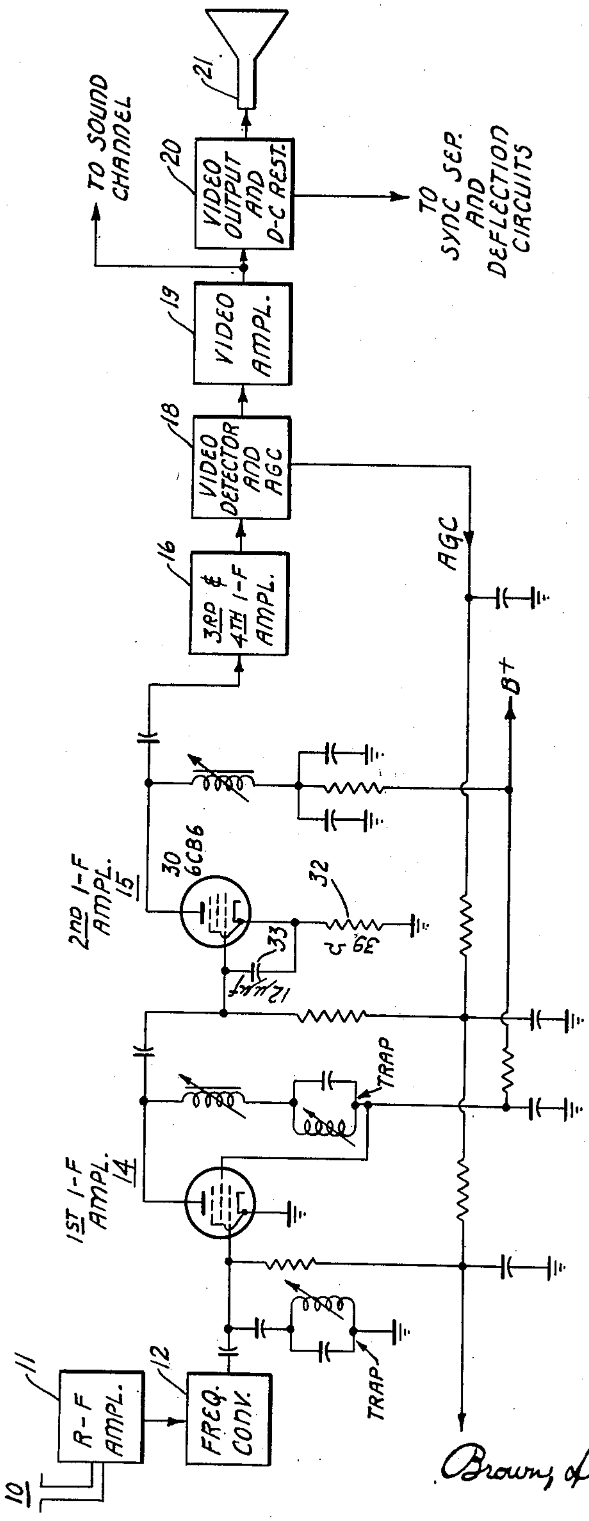

The foregoing will be better understood from a consideration of the following detailed description taken together with the accompanying drawing wherein:

Figure 1 is a representation, partly diagrammatic, partly schematic, showing a television receiver which incorporates the improvement of the present invention, and Figure 2 shows idealized frequency-response curves for a stagger-tuned I.-F. amplifier system, indicating the manner in which the response characteristic is altered, on weak signals, by the action of the means provided by the present invention.

While the present invention is also applicable to the type of television receiver now considered conventional, wherein separate I.-F. channels are provided for picture and for sound, it will be convenient to describe the invention as applied to an intercarrier-sound type of television receiver, and this type of receiver has been shown in Figure 1.

Referring now to Figure 1, there is shown a portion of a television receiver of the intercarrier-sound type comprising antenna 10, R.-F. amplifier 11, frequency converter 12, video and sound I.-F. amplifier stages 14 to 16, video detector and automatic-gain-control circuit 18, video amplifier 19, video output and D.-C. restorer 20, and picture tube 21. The sound signals may be taken off at video amplifier 19 and passed through the usual sound channel, which may comprise the usual sound I.-F. amplifier, frequency-modulation detector, audio amplifier, output stage, and loud speaker, none of which is shown in the drawing. The receiver of Figure 1 also includes, as is conventional, a synchronizing-signal separator circuit, and vertical and horizontal deflection circuits.

In intercarrier-sound television receivers, as well as in the conventional type of receiver employing separate I.-F. channels for picture and for sound, it is customary to locate the picture I.-F. carrier and the sound I.-F. carrier on opposite slopes of the frequency-response characteristic of the I.-F. amplifier system. As shown graphically in Figure 2, the picture I.-F. carrier is customarily located at about the 50% amplitude-response point on the slope at the upper-frequency end of the characteristic. In Figure 2, the picture I.-F. carrier is indicated to be 26.6 megacycles. The sound I.-F. carrier, which is a fixed number of megacycles below the picture I.-F. carrier, is located at the lower-frequency end of the characteristic, customarily on a relatively flat shelf at about the 5% amplitude-response level. In Figure 2, the sound I.-F. carrier is indicated to be 22.1 megacycles, 4.5 megacycles below the picture I.-F. carrier.

It will be seen that if, for the purpose of improving the picture, the operator adjusts his local oscillator so as to move the picture I.-F. carrier toward a lower frequency, i. e. toward the left in Figure 2, say from 26.6 megacycles to 25.6 megacycles, the main areas of the image would be substantially improved since the picture I.-F. carrier would have been moved from its normal 50% amplitude-response location to the 90–100% amplitude-response region and the low-frequency modulation components of the picture signal would have become stronger relative to the noise signals. However, the high-frequency modulation components would have been made weaker, for they would have been moved down the slope at the lower-frequency end of the characteristic. And, what is more important, since the frequency-difference between the picture and sound I.-F. carriers is fixed, the sound I.-F. carrier will necessarily have been moved to a lower frequency, i. e. from 22.1 megacycles to 21.1 megacycles, in the present example. Thus, the sound I.-F. carrier is no longer on the shelf; it has been moved off the shelf and down the slope and the sound output has been reduced to below audibility, or at least to an objectionably low level.

To avoid the undesirable results indicated above, the concept of the present invention is to provide means whereby, in lieu of shifting the picture I.-F. carrier, and hence also the sound I.-F. carrier, toward a lower frequency, to the left in Figure 2, the upper-frequency end of the frequency-response characteristic is, in response to variations in applied automatic-gain-control bias, automatically boosted at the higher frequencies in the manner indicated by the dotted line 40 in Figure 2. The sound I.-F. carrier remains undisturbed on its shelf.

The foregoing is accomplished, in accordance with my invention, by changing automatically the resonant frequency of the particular I.-F. amplifier stage which supports the upper-frequency end of the I.-F. amplifier system's overall frequency-response characteristic. In Figure 2, the second I.-F. amplifier is indicated as supporting the upper-frequency end of the characteristic. On strong signals, the second I.-F. amplifier is tuned say to 25.6 megacycles, but on weaker signals, in response to reduced bias, the means provided by the present invention shifts the resonant frequency of the second I.-F. amplifier toward say 26.3 megacycles, as indicated in Figure 2 by the dotted line 41.

It is to be particularly noted that the shifting of the resonant frequency of the second I.-F. amplifier stage toward a higher frequency, in response to a reduction in applied automatic-gain-control bias, is the reverse of that which tends inherently to occur. On weak signals, the receiver operates at substantially full gain and the input capacitance of each amplifier stage is greater than when the receiver is operating at reduced gain. Consequently, when, in the presence of weak signals, the gain of the amplifier system is increased by the operation of the automatic-gain-control system, the frequency response of the amplifier system tends to decrease at the upper-frequency end of the characteristic. The present invention, however, provides means for increasing, rather than decreasing, the response at the upper-frequency end when the gain of the amplifier system is increased.

The means employed by the present invention preferably comprise an unbypassed cathode load resistor and a fixed capacitor. The capacitor is connected between the grid of the tube and the cathode end of the cathode load resistor. Both are connected in that particular stage of the I.-F. amplifier system which supports the upper-frequency end of the overall characteristic. In Figure 1, the elements are shown to be connected in the second I.-F. amplifier stage 15, being elements 32 and 33.

It appears that, to achieve the objects of the present invention, the unbypassed cathode load resistor and grid-to-cathode capacitance are required to be of such size as to satisfy the following relation—

$$R(C_1+C_{gk})>\frac{\Delta C}{g_m}$$

where $R$=the resistance (in ohms) of the cathode load resistor.

$C_1$=the capacitance (in farads) of the external grid-cathode capacitor.

$C_{gk}$=the grid-cathode interelectrode capacitance (in farads) when the tube is cut off.

$g_m$=the transconductance (in mhos) of the tube for a particular operating point.

$\Delta C$=the change (in farads) in grid-cathode interelectrode capacitance when the transconductance is $g_m$ as compared with the capacitance when the tube is cut off.

It will be seen that the above relation may be satisfied either by keeping $(C_1+C_{gk})$ small and making R adequately large, or by keeping R small and making $(C_1+C_{gk})$ adequately large, or by a suitable combination of intermediate values. Since the employment of a cathode load resistor causes an unavoidable loss in gain, proportional to the size of the resistor, it is preferable to keep R small and to add a physical capacitor $C_1$ of sufficiently large value to produce the desired results. In practice, I prefer that the cathode load resistor be given that value which will substantially compensate for variations in the grid-cathode interelectrode capacitance of the tube. This value may be determined by the relation $$R=\frac{\Delta C}{C_{gk}g_m}$$

where R, $C_{gk}$, $\Delta C$ and $g_m$ are as defined previously above. With R having the value determined by the above relation, the physical grid-cathode capacitor $C_1$ becomes the element which effects the boost in the frequency response at the upper-frequency end of the characteristic when the signal strength weakens.

It would seem that the addition of capacitance between the grid and cathode would tend to decrease, rather than boost, the response at the high frequency end of the characteristic. Actually it has the opposite effect. The explanation appears to be that, when in response to weak signals, the mutual conductance of the tube increases, the potential difference between the grid and cathode decreases, less current flows through the grid-cathode capacitor, and the effective input capacitance of the stage decreases. Thus, the frequency at which the input network of the stage is resonant is higher on weak signals than on strong signals. This is shown graphically in Figure 2 where the dotted line 41 indicates the response of the second I.-F. amplifier stage on weak signals and the solid-line curve 42 indicates the response on strong signals. The effect on the overall characteristic of shifting the resonant frequency of the particular I.-F. amplifier stage which supports the upper-frequency end of the characteristic is also shown graphically in Figure 2. There, the dotted line 40 indicates the manner in which the overall response is boosted on weak signals.

In Figure 1, I have shown, for purposes of illustration, typical values of grid-cathode capacitor and of cathode resistor which may be employed to achieve the desired boost in response at the picture I.-F. carrier frequency. Tube 30 is a 6CB6 having a cold grid-to-cathode interelectrode capacitance of 4.8 $\mu\mu$f. and a hot capacitance of 6.3 $\mu\mu$f., a variation of 1.5 $\mu\mu$f. The transconductance of the tube at full gain is of the order of 6000 $\mu$mhos. The cathode resistor 32 is 39 ohms. Capacitor 33 has a value of 12 $\mu\mu$f.

Setting the above values to the symbols used in the formulae hereinbefore given, we have $$R=39 \text{ ohms}$$

$$C^1=12\ \mu\mu\text{f.}$$

$$C_{gk}=4.8\ \mu\mu\text{f.}$$

$$g_m=6000\ \mu\text{mhos.}$$

$$\Delta C=1.5\ \mu\mu\text{f.}$$

Applying these values to the first formula $$R(C_1+C_{gk})>\frac{\Delta C}{g_m}$$

we get $$39(12+4.8)10^{-12}>\frac{1.4\times10^{-12}}{6000\times10^{-6}}$$

Solving, we find that $$655.2\times10^{-12}>250\times10^{-12}$$

or $$655.2>250$$

Thus, we see that the values of R and $C_1$ given, by way of example, in the circuit of Figure 1, satisfy the first formula.

Applying the appropriate values to the second formula, which states that R should have a value substantially equal to $$\frac{\Delta C}{C_{gk}g_m}$$

we get $$\frac{1.5\times10^{-12}}{(4.8\times10^{-12})\times(6000\times10^{-6})}$$

Solving, we find that R should be substantially equal to $$\frac{1.5\times10^{3}}{28.8}=52 \text{ ohms}$$

In other words, we find that the cathode load resistor R should have a value of the order of 52 ohms.

In the circuit of Figure 1, which represents a commercial embodiment of the invention, a 39-ohm resistor is used. It will be understood that this value is substantially equal to that indicated by the second formula.

Having described my invention, I claim:

1. In a high-frequency amplifier stage; a tube having at least cathode, control grid and anode electrodes and a tuned network which includes as a component the inherent input capacitance of said tube, said input capacitance being subject to variation as a function of control-grid bias whereby the frequency response of said stage tends to decrease at the higher frequencies as said bias is made less negative; and means responsive automatically to variations in control-grid bias for varying the frequency response in a direction opposite to, and to an extent greater than is necessary to compensate for, the variations which tend to occur in said frequency response with changes in said bias, said means comprising, in combination, a cathode load resistor connected in the cathode-to-anode circuit of said tube, and a capacitor connected between the cathode end of said resistor and the control grid of said tube, said capacitor having a value which will satisfy the relation—

$$R(C_1+C_{gk})>\frac{\Delta C}{g_m}$$

where $R$=the resistance (in ohms) of the cathode load resistor,
$C_1$=the capacitance (in farads) of the external grid-cathode capacitor,
$C_{gk}$=the grid-cathode interelectrode capacitance (in farads) when the tube is cut off,
$g_m$=the transconductance (in mhos) of the tube for a particular operating point,
$\Delta C$=the change (in farads) in grid-cathode interelectrode capacitance when the transconductance is $g_m$ as compared with the capacitance when the tube is cut off, and R having a value substantially equal to that which will satisfy the relation—

$$R=\frac{\Delta C}{C_{gk}g_m}$$

2. In a television receiver; an intermediate-frequency amplifier system comprising a plurality of stagger-tuned stages each of which includes a tube having at least cathode, control grid and anode and a tuned input network which includes as a component the inherent input capacitance of said tube, said amplifier system having a pass band which includes, near the upper-frequency end, the picture I.-F. carrier frequency, one of said stages being tuned to a frequency near said upper-frequency end; an automatic-gain-control system for developing a control bias and applying said bias to at least some of said stages of said amplifier system including said stage tuned to a frequency near said upper-frequency end, thereby to vary the gain of the stages to which said bias is applied in response to variations in signal strength; and means responsive to variations in control bias for modifying automatically the pass band of said amplifier system in such manner that the response to weak signals at the picture I.-F. carrier frequency is substantially increased, said last-named responsive means comprising a capacitor connected between the grid and cathode of the tube of said amplifier stage which is tuned to a frequency near said upper-frequency end and a cathode load resistor connected between said last-named cathode and ground, said grid-to-cathode capacitor having a value which will satisfy the relation—

$$R(C_1+C_{gk})>\frac{\Delta C}{g_m}$$

where $R$=the resistance (in ohms) of the cathode load resistor,
$C_1$=the capacitance (in farads) of the external grid-cathode capacitor,
$C_{gk}$=the grid-cathode interelectrode capacitance (in farads) when the tube is cut off,
$g_m$=the transconductance (in mhos) of the tube for a particular operating point,
$\Delta C$=the change (in farads) in grid-cathode interelectrode capacitance when the transconductance is $g_m$ as compared with the capacitance when the tube is cut off, and R having a value substantially equal to that which will satisfy the relation—

$$R=\frac{\Delta C}{C_{gk}g_m}$$

3. In an amplifier system; a plurality of stagger-tuned amplifier stages each of which includes a tube having at least cathode, control grid and anode and a tuned input network which includes as a component the inherent input capacitance of said tube, one of said stages being tuned to a frequency near the upper-frequency end of the pass band of said system; an automatic-gain-control system for developing a control bias and applying said bias to at least some of said stages of said amplifier system including said stage tuned to a frequency near said upper-frequency end, thereby to vary the gain of the stages to which said bias is applied in response to variations in signal strength; and means responsive to variations in control bias for modifying automatically the pass band of said amplifier system in such manner that the response to weak signals at frequencies near said upper-frequency end of said pass band is substantially increased, said last-named responsive means comprising a capacitor connected between the grid and cathode of the tube of said amplifier stage which is tuned to a frequency near said upper-frequency end and a cathode load resistor connected between said last-named cathode and ground, said grid-to-cathode capacitor having a value which will satisfy the relation—

$$R(C_1+C_{gk})>\frac{\Delta C}{g_m}$$

where $R$=the resistance (in ohms) of the cathode load resistor,
$C_1$=the capacitance (in farads) of the external grid-cathode capacitor,
$C_{gk}$=the grid-cathode interelectrode capacitance (in farads) when the tube is cut off,
$g_m$=the transconductance (in mhos) of the tube for a particular operating point,
$\Delta C$=the change (in farads) in grid-cathode interelectrode capacitance when the transconductance is $g_m$ as compared with the capacitance when the tube is cut off, and R having a value substantially equal to that which will satisfy the relation—

$$R=\frac{\Delta C}{C_{gk}g_m}$$

OLIVER F. CHENEY.

References Cited in the file of this patent

UNITED STATES PATENTS

| Number | Name | Date |
|---|---|---|
| 2,093,556 | Foster | Sept. 21, 1937 |
| 2,185,879 | Allen | Jan. 2, 1940 |
| 2,243,141 | Weagent | May 27, 1941 |
| 2,394,544 | Gottier | Feb. 12, 1946 |
| 2,435,960 | Fyler | Feb. 17, 1948 |
| 2,455,510 | Ludwig | Dec. 7, 1948 |
| 2,522,567 | Cook | Sept. 19, 1950 |
| 2,540,532 | Koch | Feb. 6, 1951 |